METHOD FOR PRODUCING EVAPORATION INHIBITING COATING FOR PROTECTION OF SILICON-GERMANIUM AND SILICON-MOLYBDENUM ALLOYS AT HIGH TEMPERATURES IN VACUUM

Filed June 4, 1971

2 Sheets-Sheet 1

INVENTOR

Pao J. Chao

Roland A. Anderson

Attorney

INVENTOR.
Pao J. Chao

United States Patent Office 3,783,031
Patented Jan. 1, 1974

3,783,031

METHOD FOR PRODUCING EVAPORATION INHIBITING COATING FOR PROTECTION OF SILICON-GERMANIUM AND SILICON-MOLYBDENUM ALLOYS AT HIGH TEMPERATURES IN VACUUM

Pao J. Chao, Allendale, N.J., assignor to the United States of America as represented by the United States Atomic Energy Commission Filed June 4, 1971, Ser. No. 150,942
Int. Cl. H01v 1/02
U.S. Cl. 136—237 5 Claims

ABSTRACT OF THE DISCLOSURE

Method for protecting Si—Ge and Si—Mo alloys for use in thermocouples by coating the alloys with silicon to inhibit the evaporation of the alloys at high temperatures in a vacuum. Specific means and methods are provided.

CROSS REFERENCE TO RELATED APPLICATIONS

Ser. No. 101,539, filed Mar. 30, 1971, by Kot, and U.S. Pat. 3,627,650.

BACKGROUND OF THE INVENTION

In the field of thermoelectric generators, a need exists for maintaining the mechanical, electrical and chemical stability of thermocouple elements through a large range of operating parameters, comprising a temperature range of up to 900° or more. One means for maintaining the desired stability has been the use of relatively stable alloys of silicon, such as specific alloys of silicon-germanium or silicon-molybdenum, but even these materials have been subject to evaporation at these temperatures when operated in a vacuum. It is also advantageous to provide an improved coating for thermoelectric generator elements.

It is an object of this invention, therefore, to provide improved thermoelectric generator elements and an improved method for making the same.

It is another object to provide an improved method for maintaining the stability of thermoelectric elements.

It is another object to coat thermocouples for use at high temperatures in a vacuum.

It is still another object of this invention to prevent degradation of thermoelectric generator elements by evaporation in a vacuum.

SUMMARY OF THE INVENTION

This invention provides means for maintaining the stability of silicon alloy thermoelectric generator elements by preventing the evaporation of materials therefrom at high temperatures in a vacuum. More particularly, this invention provides an improved apparatus and method that contemplates specific silicon and silica coatings for stabilizing specific Si—Ge and Si—Mo thermoelectric generator elements for operation at high temperatures up to 900° C. or more in air and in a vacuum. In one embodiment, a silicon coating is applied by chemical vapor deposition, and silica layers are applied by thermal growing and chemical vapor deposition. With the proper selection of steps and their sequence, as described in more detail hereinafter, the desired thermoelectric generator elements are achieved.

The above and further objects and novel features will become apparent from the following description of one embodiment when the same is read in connection with the accompanying drawings, and the novel features will be particularly pointed out in the appended claims.

BRIEF DESCRIPTION OF THE DRAWINGS

In the drawings, where like elements are referenced alike.

DESCRIPTION OF THE PREFERRED EMBODIMENT

This invention is useful in fabricating specific silicon alloy containing thermoelectric generator elements for use at specific high temperatures in air and in a vacuum. As such, this invention is particularly useful in connection with the thermocouple elements described in the above-referenced co-pending applications for use in air and a vacuum at high temperatures. Therefore, as will be understood in more detail hereinafter, this invention is an improvement over the inventions described and shown in those applications.

As described in the above-referenced co-pending applications, suitable silicon alloys for air-vacuum operable thermoelectric generators, comprise Si—Ge and Si—Mo alloys containing 63.5 to 85 at. percent Si. The invention hereinafter described utilizes silicon alloy thermocouple elements of this type having specific silicon coatings thereon.

Figures 1, 4, 5:
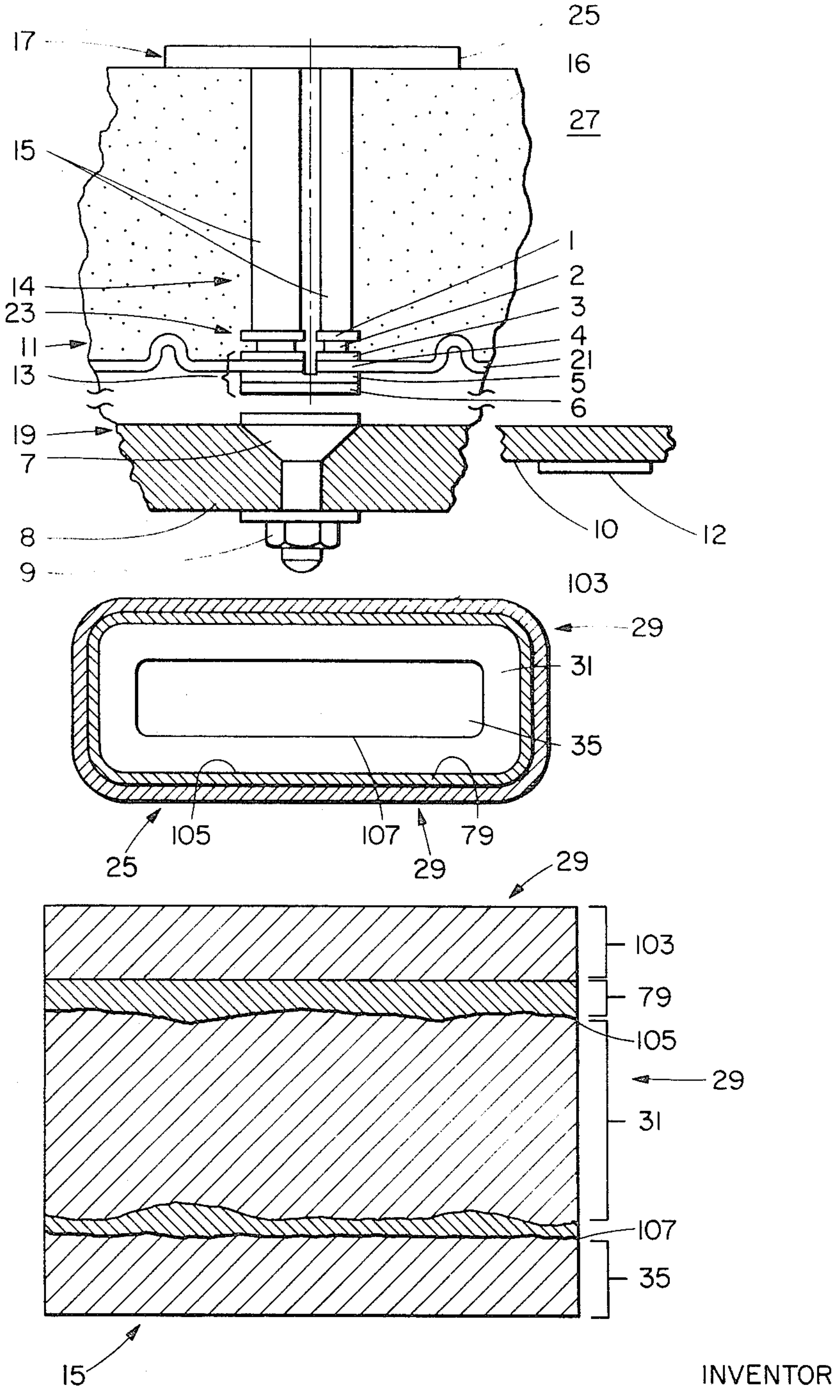
FIG. 1 is a partial cross-section of one embodiment of the thermocouple apparatus of this invention.
FIG. 4 is a schematic illustration of a cross-sectional structure of a silicon-alloy substrate having silicon, thermally grown silica, and chemical vapor deposited silica thereon in accordance with this invention.
FIG. 5 is a drawing corresponding to the microstructure at 580× of an N-type 70 at. percent Si Si—Ge substrate having a silicon coat, a thermally grown silica film, and a chemical vapor deposited silica addition thereon in accordance with this invention.

Referring now to FIG. 1, air-vacuum operable (hereinafter referred to as air-vac) thermoelectric device 11, which is advantageously a radioisotope heated electrical generator for operation in space, forms stacks 13 of thermocouples 14, comprising silicon alloy thermoelectric elements 15. As understood in the art, these air-vac elements 15 advantageously, comprise Si-Ge or Si-Mo elements 15 having conventional n or p type dopants and 63.5 to 85 at percent Si for operation in air in a terrestrial launch ambient and a vacuum space ambient at high temperatures of up to 900° C. or more. In this regard, these elements 15 produce electrical energy from a thermal gradient across the elements 15 from a hot junction end 17 to a cold junction end 19 thereof. Advantageously, a plurality of these elements 15 are assembled in a cascade with suitable hot junctions, cold junctions, connections and other elements, such as shown in FIG. 1, and described in the following Table I, as understood from the above-referenced applications.

TABLE I

| Reference No. (FIG. 1): | Element |
|---|---|
| 1 | Cold shoe (tungsten). |
| 2 | Pedestal (copper). |
| 3 | Compensator (tungsten). |
| 4 | Electrical connector (copper). |
| 5 | Electrical insulator (alumina). |
| 6 | Compensator (copper). |
| 7 | Mount stud (steel). |
| 8 | Radiator-baseplate (aluminum). |
| 9 | Nut (steel). |
| 10 | Radiator-baseplate (copper)—brazed construction. |
| 11 | Radioisotope heated thermoelectric generator. |
| 12 | Compensator (tungsten). |
| 13 | Cold stack. |
| 14 | Thermocouples. |
| 15 | Thermoelectric elements (n and p). |
| 16 | Thermal insulation (Dynaquartz). |
| 17 | Hot junction end. |
| 19 | Cold junction end. |
| 21 | Flexible connector. |
| 23 | Connections. |
| 25 | Hot shoes (n and p). |

As understood in the art, the mechanical, electrical and chemical stability of the thermocouple 14 and its allied components is of paramount importance. To help provide chemical, mechanical and electrical stability of the thermocouples 14, cold stacks 13 have flexible connectors 21 therebetween and suitable connections 23, such as silicon alloy hot shoes 25 for the silicon alloy n and p type dopsed thermoelectric elements 15, and suitable thermocouple connections 23 and other thermocouple elements, comprising hot shoes 25 and thermoelectric elements 15, which are designed to operate in an air-vac ambient 27. To prevent the evaporation of these hot shoes 25 and their n and p type silicon alloy thermoelectric elements 15 in a 900° C., vacuum, space ambient 27, in accordance with this invention, these hot shoes 25 and elements 15 are encapsulated in an envelope 29. As will be understood in more detail hereinafter, this invention provides an envelope 29, advantageously comprising a silica coated silicon coating 31. In accordance with the method of this invention, the silicon is applied by the specific step of chemical vapor deposition, and the silica is applied by the specific steps of thermal growing and chemical vapor deposition in a particular sequence, as hereinafter discussed in more detail. For ease of explanation silicon-molybdenum hot shoes 25 and silicon-germanium thermoelectric elements 15 will be described, but it is understood that these structures may be made from either silicon-germanium or silicon-molybdenum alloys. In either case, these hot shoes 25 and thermoelectric elements in actual practice advantageously contain from 63.5 at. percent to 80 at. percent silicon, but will be described hereinafter as, comprising 70 at. percent silicon.

In understanding this invention, it has been found that the uncoated silicon-germanium thermoelectric elements 15 and hot shoes 25 can be operated at elevated temperatures in air for a short predetermined period of time with predetermined effects, comprising a self-generated silica-rich glassy layer that forms during the early stages of operation in the described device 11. Also, the above described use hereof in space with an earth launching vehicle will produce a glassy layer. This glassy layer so formed will protect the silicon-germanium thermoelectric elements 15 and the silicon-molybdenum hot shoes 25 from oxidation. However, this glassy layer will not effectively inhibit evaporation of the conventional n and/or p type dopants from elements 15, or the silicon, germanium or molybdenum from elements 15 or hot shoes 25 during prolonged periods of operation at high temperatures in a vacuum ambient 27. It will be understood, therefore, that the loss of dopants, silicon, germanium and molybdenum not only degrades the function of the thermoelectric elements 15 and hot shoes 25, but eventually will completely destroy the air-vac thermocouples 14. Therefore, the silicon and silica of the envelope 29 of this invention are used to protect the elements 15 and hot shoes 25 from the above-described undesirable evaporation at temperatures of up to 900° C. or more in the air-vac structure of device 11. The described structures 15 and 25 that are protected in accordance with this invention are referred to hereinafter as silicon alloy substrates 35.

One embodiment of the method of this invention for providing the desired protection, comprises preparing the above-described silicon alloy substrates 35 by polishing and cleaning. After cleaning, the prepared substrates 35 are ready for the application of a silicon coating 31 to the desired thickness by chemical vapor deposition. In accordance with this embodiment of this invention, this first silicon coating 31 is deposited using standard raw materials and equipment well known in the art, such as standard commercial CVD chemical vapor deposition equipment. In one example, this chemical vapor deposition is accomplished by the hydrogen reduction of silicon tetrachloride. This is accomplished, for example, by the reaction $$SiCl_4+2H_2 \rightarrow Si+4HCl,$$

where hydrogen is used as a carrier gas and reducing agent for $SiCl_4$. While FIG. 2 is a schematic diagram of a typical set for the above described procedure, silane and other volatile silicon compounds can also be used as the source of silicon for deposition.

Figures 2, 3:
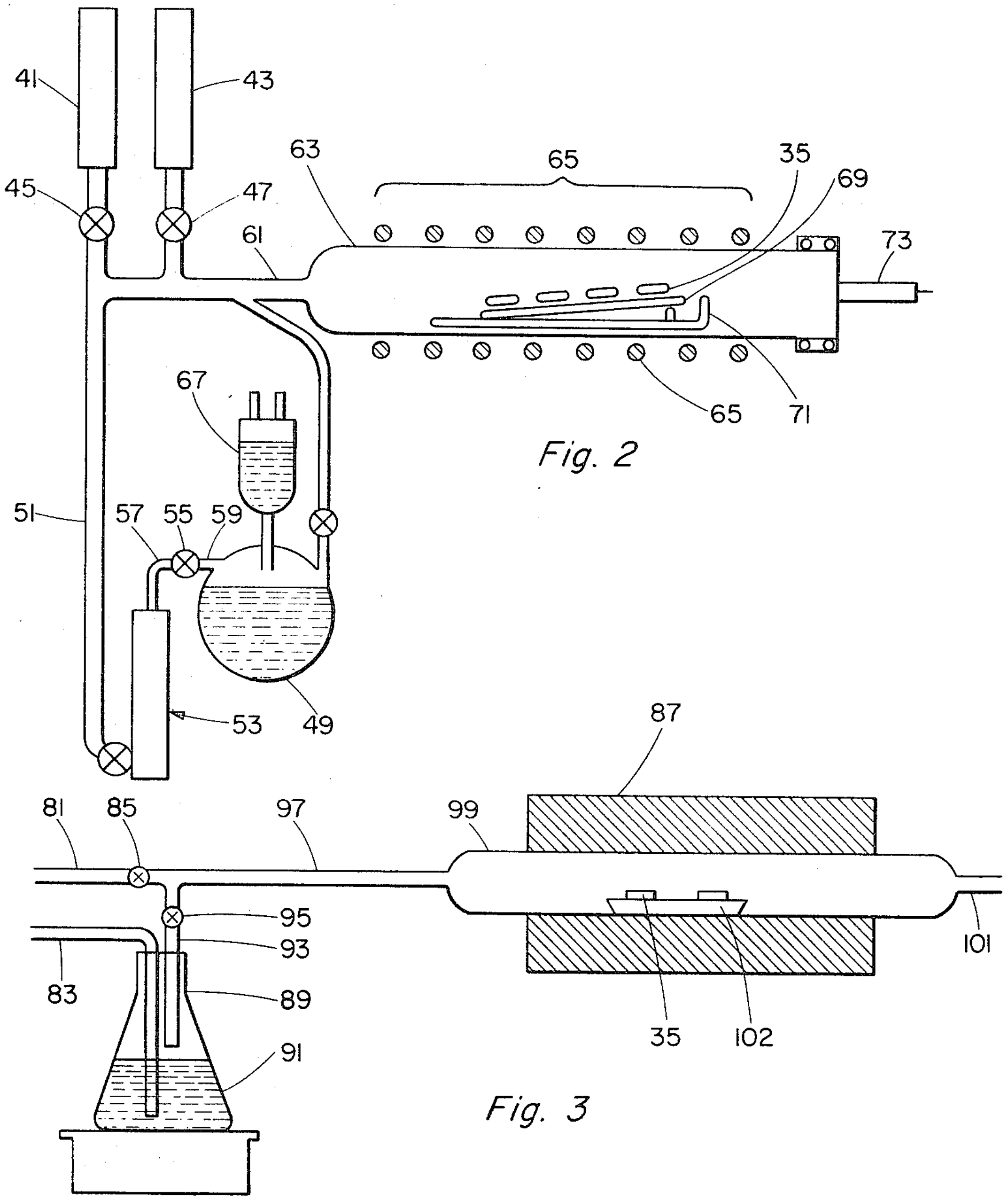
FIG. 2 is a partial schematic diagram of apparatus for the several vapor deposition steps of this invention.
FIG. 3 is a partial schematic diagram of apparatus for the formation of a $SiO_2$ coating by thermal oxidation in accordance with this invention.

Referring to the apparatus of FIG. 2, $H_2$ gas enters flowmeter 41 and $N_2$ gas enters flowmeter 43 under a positive pressure supplied by a suitable source (not shown) when valves 45 and 47 open. The $H_2$ gas circulates through vaporized 49 by means of a tube 51 having a flowmeter 53 connecting tube 51 with the vaporizer 49, and a valve 55 having tubes 57 and 59 connecting the flowmeter 53 with vaporizer 49. A tube 61 connects the flowmeters 41 and 43 with quartz deposition reactor 63. Radio frequency coils 65 supply heat energy to the contents of reactor 63 for producing the desired reaction therein. To this end reservoir 67 supplies $SiCl_4$ to vaporizer 49 while flowmeter 53 supplies $H_2$ carrier gas thereto so that $SiCl_4$ vapor in the carrier are supplied from vaporizer 49 to the reactor 63, which contains the substrates 35. Advantageously, the substrates 35 are placed on a silicon carbide coated graphite susceptor 69, which is coated toward the flow of the $SiCl_4$ vapor from vaporizer 49 by fused quartz sled 71. The $SiCl_4$ vapor in the $H_2$ carrier thus passes into and out of reactor 63 chemically to coat substrate 35 with silicon to form the first 31 while the vapor exhausts from reactor 63 through a scrubber exhaust tube 73.

In one example, the thermal growing of silica on the silicon coat 31 on the silicon-germanium and silicon-molybdenum substrates 35, is carried out in the apparatus of FIG. 3 at temperatures above 900° C. for a predetermined period of time, which depends upon the desired thickness of silica film 79. To this end, a regulated oxygen flow is supplied under pressure from a suitable source (not shown) through tubes 81 and 83. Tube 81 connects through valve 85 to resistance furnace 87, and tube 83 connects with furnace 87 via container 89 to pick up water 91 therein, tube 93, valve 95 and tube 97, which also connects valve 85 with a fused quartz tube 99 in furnace 87 and exhaust 101. The substrate 35 having a first chemical vapor deposited silicon coat 31 thereon rests in quartz tube 99 on quartz boat 102, whereby the heated oxygen in furnace 87 fuses the outside of the silicon coat 31 to sandwich this coat 31 between silica film 79 and substrate 35.

An addition 103 to silica film 79 is achieved in the preferred example of this invention by chemical vapor depposition on film 79 in apparatus of the kind shown in FIG. 2. This is accomplished by pyrolysis of tetraethylorthosilicate, where the reaction is $$(C_2H_5)_4SiO_4 \rightarrow SiO_2+2H_2O+4C_2H_4$$

To this end, hydrogen gas is used as the carrier for the $(C_2H_5)_4SiO_4$, which is vaporized from a reservoir 67 and a vaporizer 49 like those described above, but which contain $(C_2H_5)_4SiO_4$. The required thickness of the vapor deposited silica addition 103 is determined on the basis of the operational conditions of the thermoelectric device 11.

The cross-sectional structure of the envelope 29 of the coated substrate 35 is illustrated schematically in FIG. 4, which corresponds to the microstructure illustrated by FIG. 5.

In operation, the first deposited silicon coat 31 has several major functions. These, comprise providing a diffusion barrier to germanium, which diffuses from the substrate 35 outwardly into the subsequently applied silica surface film 79 that is produced by the thermal oxidation of the silicon coat 31; and strengthening the bond between the substrate 35 and the subsequently applied silica coatings, the bond 105 between the silicon coat 31 and the silica film 79 being stronger than between the silicon-germanium substrate 35 and a silica film applied directly thereon.

The functions of the thermally grown silica film 79 comprise establishing a sound foundation for the silica addition 103 that is applied to film 79 by chemical vapor deposition. In this regard, the formation of the thermally grown silica film 79 results from oxidation and diffusion of oxygen into the chemical vapor deposited silicon coat 31. Therefore, the silicon coat 31 and the silica film 79 are chemically and mechanically bonded to each other by the described method across bond 105. This bond 105 is much stronger than between an overclad coating and its substrate. The thermally grown silica film 79 also facilitates the uniform nucleation of the silica addition 103. In this regard, vapor deposited silica applied directly onto the silicon precoating or the silicon-germanium substrate tends to spall when it is heated at elevated temperatures in vacuum, and consequently such a coating becomes ineffective in inhibiting evaporation.

It has also been found that the growth of the thickness of the thermally grown silica film 79 is limited and the production of a relatively thicker coat is very time consuming. Therefore, the required silica addition 103 is preferably accomplished by the described chemical vapor deposition of this invention.

In further regard to the above, at elevated temperatures, for instance at 1000° C., the thermal expansion of the fused silica glass of film 79 is 0.05% of the silica of coat 31 is 0.37%, and of the silicon-germanium of substrate 35 is 0.42%. When the substrate 35 (e.g. silicon-germanium substrate 35) is encased in envelope 29 by the described layer of silicon coat 31, silica film 79 and silica addition 103, they give successive compression to the substrate 35 across a bond 107. The compression force not only mechanically strengthens the bond 107 but also exerts a pressure on the substrate 35 that helps to inhibit the described undersirable evaporation therefrom. The envelope 29 of this invention thus is mechanically, electrically and chemically stable, and provides an improved stable thermoelectric structure.

In actual practice, specimens of substrates 35 coated with silicon coat 31, thermally grown silica film 79 and chemical vapor deposited silica addition 103, have been tested at 1100° C. under $10^{-5}$ torr vacuum for more than 1000 hours and to date show no evidence of evaporation. This indicates that the described compositions, layers and coatings of this invention are very effective for inhibition of the described undesirable evaporation.

While the above has described a stable envelope 29 for Si alloy substrates 35, it will be understood that the system of this invention can also provide an envelope 29 for a graphite coated substrate 35. In this regard the pure silicon coat 31 is applied to the graphite coat by means of the described chemical vapor deposition, the graphite, because of its low weight, high mechanical strength, high heat conducivity, low electrical resistance and low thermal coefficient of expansion, which matches that of silicon-germanium substrates 35, is particularly desirable for use for hot shoes 25. Because graphite is readily oxidized at temperatures above 500° C. in air, and catastrophically attacked by oxidation at from 900° to 1000° C. or above, the silicon-silica coats and layers 31, 79 and 103 of this invention, advantageously protect the graphite from such oxidation.

This invention has the advantage of providing an improved thermoelectric structure and a method of making the same. The method has the advantage of coating specific compositions on specific thermocouple elements to avoid evaporation therefrom at high temperatures in a vacuum. The thermoelectric structure of this invention, therefore, has the advantage of providing stable operation in air and a vacuum at high temperature.

What is claimed is:

1. Thermoelectric apparatus, comprising:
(a) silicon-germanium alloy thermoelectric means; and
(b) three-layer protective coating means on the thermoelectric means for preventing evaporation of germanium through said three-layer coating means from said silicon-germanium alloy thermoelectric means,
said three-layer coating means consisting of
a first coat of silicon forming a first bond on the silicon-germanium alloy thermoelectric means for compressing the same across the first bond to provide a diffusion barrier to the evaporation of germanium through said first bond,
a second film of silica formed from a top portion of the first coat of silicon to provide a mechanical and chemical second bond therewith for further compressing the thermoelectric means across said first bond, and
a separately deposited third silica addition on the top of the second film and forming a third bond therewith for compressing the thermoelectric means across the first bond,
the compressions across said first bond mechanically strengthening said first bond and exerting a pressure on the thermoelectric means that helps inhibit the evaporation of the germanium therefrom at higher temperatures in a vacuum.

2. The apparatus of claim 1 in which the SiGe alloy means is a thermoelectric means containing between 63.5 at. percent and 80 at. percent silicon that is surrounded by said deposited coat of silicon.

3. The invention of claim 2 in which said SiGe alloy thermoelectric means comprises conducting means and thermoelectric means in contact therewith containing between 63.5 at. percent and 80 at. percent silicon for producing a thermoelectric current stably in air and a vacuum ambient at 900° C. and above around the deposited silica addition.

4. The invention of claim 2 in which said second film forms thermally grown silica glass having a thermal expansion of 0.05% at 1000° C., said silicon first coat has a thermal expansion of 0.37% at 1000° C., and said silicon-germanium alloy thermoelectric means has a thermal expansion of 0.42% at 1000° C., said expansions being different from each other for producing said compressions.

5. The invention of claim 1 in which the three-layer protective coating means produces successive compressions of the SiGe alloy means at elevated temperatures to inhibit the evaporation of Ge therefrom.

References Cited

UNITED STATES PATENTS

| | | | |
|---|---|---|---|
| 3,128,545 | 4/1964 | Cooper | 136—237 |
| 3,485,679 | 12/1969 | Dingwall | 136—237 |
| 3,470,033 | 9/1969 | Oesterhelt et al. | 136—237 |
| 3,442,718 | 5/1969 | Dingwall et al. | 136—237 |

| | | | |
|---|---|---|---|
| 3,523,832 | 8/1970 | Rupprecht et al. | 136—237 |
| 3,627,650 | 12/1971 | Seuffert | 136—237 |
| 3,547,786 | 12/1970 | Rigo | 317—235/46.5 |
| 3,585,469 | 6/1971 | Jager et al. | 317—235/46.5 |

HARVEY E. BEHREND, Primary Examiner

U.S. Cl. X.R.

136—201, 239; 317—234

UNITED STATES PATENT OFFICE
CERTIFICATE OF CORRECTION

Patent No. 3,783,031 Dated January 1, 1974

Inventor(s) Pao J. Chao

It is certified that error appears in the above-identified patent and that said Letters Patent are hereby corrected as shown below:

In the heading of the sheets showing the drawings, change "Chad" to --Chao--.

Signed and sealed this 23rd day of April 1974.

(SEAL)
Attest:

EDWARD M.FLETCHER,JR.
Attesting Officer

C. MARSHALL DANN
Commissioner of Patents